United States Patent
Batten et al.

(10) Patent No.: US 7,215,276 B2
(45) Date of Patent: May 8, 2007

(54) RADAR DETECTOR

(75) Inventors: Michael Batten, Westminster, MA (US); Craig R. Autio, Orange, MA (US)

(73) Assignee: The Whistler Group, Inc., Chelmsford, MA (US)

( * ) Notice: Subject to any disclaimer, the term of this patent is extended or adjusted under 35 U.S.C. 154(b) by 0 days.

(21) Appl. No.: 10/741,104

(22) Filed: Dec. 19, 2003

(65) Prior Publication Data

US 2007/0018879 A1    Jan. 25, 2007

(51) Int. Cl.
*H04K 3/00* (2006.01)
*G01S 7/00* (2006.01)
*G01S 13/00* (2006.01)

(52) U.S. Cl. .................. 342/20; 342/13; 342/89; 342/175; 342/195

(58) Field of Classification Search ...... 455/226.1–229; 342/13–20, 89, 90, 175, 192–197
See application file for complete search history.

(56) References Cited

U.S. PATENT DOCUMENTS

| | | | | |
|---|---|---|---|---|
| 4,313,216 A | * | 1/1982 | Jaeger et al. | 455/226.1 |
| 4,581,769 A | * | 4/1986 | Grimsley et al. | 455/226.1 |
| 5,122,801 A | * | 6/1992 | Hughes | 342/13 |
| 5,146,226 A | * | 9/1992 | Valentine et al. | 342/20 |
| 5,206,651 A | * | 4/1993 | Valentine et al. | 342/20 |
| 5,250,951 A | * | 10/1993 | Valentine et al. | 342/20 |
| 5,300,932 A | * | 4/1994 | Valentine et al. | 342/20 |
| 5,588,057 A | * | 12/1996 | Sullivan | 342/15 |
| 6,400,305 B1 | * | 6/2002 | Kuhn | 342/20 |

* cited by examiner

*Primary Examiner*—Bernarr E. Gregory
(74) *Attorney, Agent, or Firm*—David W. Carstens; Carstens & Cahoon, LLP

(57) ABSTRACT

A method for detecting radar is provided by the present invention. The invention begins by sweeping a first local oscillator (LO). Once a band has been identified as containing a radar signal, the detector interrupts its normal operation and rechecks the frequency in question for confirmation of CW radar, rather than waiting for the initial sweep to finish. Upon receiving partial information from the initial fast sweep, the detector may repeat this sweep at a slower rate in order to improve sensitivity towards a CW source. If information was from a CW source one can be assured to see the information again when sweeping the same frequency. By contrast, if initial information is from a swept radar detector the information will not be present in the rescan, as the offending radar detector would have moved to a different frequency during the same period of time.

18 Claims, 9 Drawing Sheets

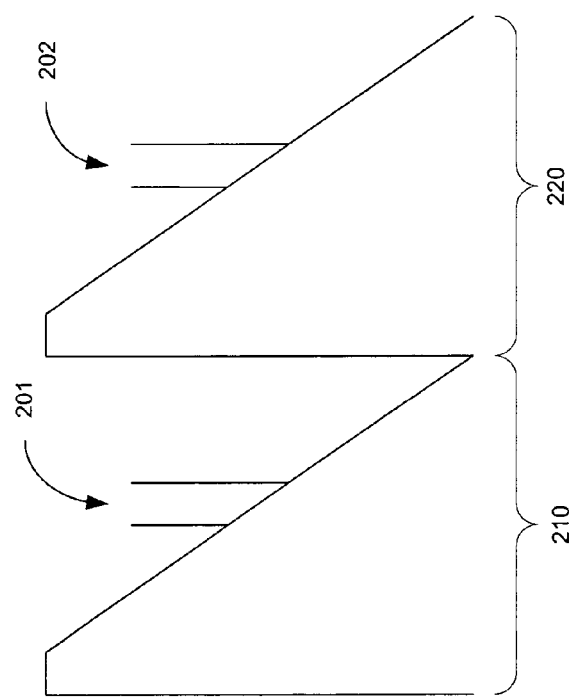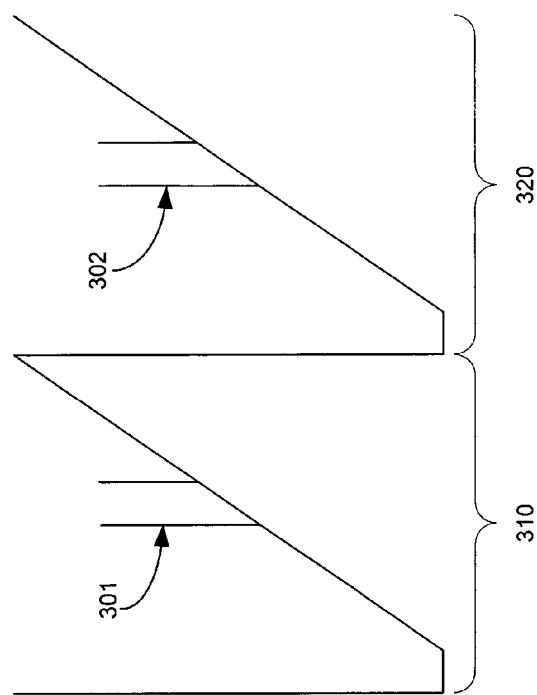

RADAR DETECTOR

BACKGROUND OF THE INVENTION

1. Technical Field

The present invention relates to a detector device, and more particularly, to a method for decreasing time to respond to police radar while maintaining selectivity towards signals produced by other police radar detectors.

2. Description of the Related Art

As is generally known in the art, speed detection systems may be used to determine the speed of moving objects, such as automobiles and other motorized vehicles. Speed detection systems currently known in the art typically utilize either radar or laser devices in their operation. A speed detection system that utilizes radar may generally be referred to as a so-called radar gun. Radar guns typically include a microwave signal source that emits a signal having a frequency in the radio-frequency electromagnetic spectrum. The radio-frequency spectrum utilized in speed-detection radar devices is divided into a series of bands, with each band covering a range of frequencies within the radio-frequency spectrum. The frequencies of interest range from about 10.500 to 36.000 GHz., although all the frequencies within this range are not allocated for speed-detection radar devices. The bands which are allocated for this purpose include: X-band, which ranges from 10.500–10.550 GHz.; K-band, which ranges from 24.050–24.250 GHz.; and Ka band, which presently ranges 33.400–36.000 GHz. Furthermore, radar guns may emit signals in either a continuous or a pulsed mode.

Operators of moving vehicles oftentimes find it useful know when the speed of their vehicle is being monitored. Thus, electronic assemblies for detecting the presence of speed detection systems have been developed and are now in common use. Typically, such assemblies include a detection means, a processing means and a displaying means. For example, an electronic assembly capable of detecting the presence of speed detection systems utilizing radar is generally known and will be referred to as a radar detector. A radar detector typically includes an antenna, which receives radiated radio-frequency electromagnetic waves and converts them into electrical signals. A horn antenna 120, such as shown in FIG. 6 of U.S. Pat. No. 5,146,227, is typical of conventional radar detectors. The horn antenna derives its name from the characteristic flared appearance. The flared portion can be square, rectangular, or conical. The maximum response of such an antenna corresponds with the axis of the horn.

Detector devices known in the art typically include a housing containing the detection, processing and displaying means. The housing is comprised of a generally rectangular box with the detection means protruding out one end, the displaying means fixed on the other end, and the processing means disposed there between. The housing may also include an internal power source or a port for an external power supply. The housing of such devices is typically mounted on the dashboard of a motor vehicle or clipped to an overhead visor. When properly mounted, the longitudinal axis of the detector device is typically oriented parallel with the longitudinal orientation of the motor vehicle. The detection means of the device is typically oriented with the front and/or, in some instances, the rear of the vehicle.

At first, police speed radar was only on X band and a simple detector diode and horn was necessary to sense the electromagnetic radiation. This method of detection was completely passive and did not emit electromagnetic radiation. As K band was introduced, early detectors modified their horn and detector diode to receive the new frequency as well as the older X band frequency. This method of detection was also completely passive and did not emit electromagnetic radiation. As X and K band police speed radar advanced with lower emissions and instant on features, it became necessary for detector manufacturers to become more sensitive and to provide advanced consumer warning of the presence of police radar. This required a change in technology and for the first time, consumer radar detectors became active devices by using an internal RF oscillator to beat against a detector diode.

There were two basic methods of performing the frequency coverage necessary to detect X band and K band. One method uses a fixed first LO (local oscillator) at approximately 11.535 GHz and a sweeping second LO at approximately 1 GHz, with a swept coverage of approximately 250 MHz. The other method was a swept first LO at approximately 11.500 GHz to 11.600 GHz and a fixed second LO at approximately 1GHz. For the first time both units had to deal with the radiated emissions of each other.

More frequencies have been added for police speed radar usage like the introduction of 34.3 GHz in the late 1980's, 34.000 GHz to 35.000 GHz in the early 1990's, and finally 33.400 GHZ to 36.000 GHz in the mid 1990's.

This has caused radar detector manufacturers to create a number of changes over the years in order to detect the new bands of operation. Because the new speed radar frequencies were introduced in stages a few years apart, there are now many variations of first LO frequency plans and sweep rates. Most operate in a saw-tooth pattern in which the Local Oscillator starts at a desired frequency and then sweeps at a slow rate to a second lower desired frequency in order to detect police speed radar at acceptable performance levels. A few models sweep in the opposite direction of the saw-tooth in order to minimize sensitivity towards the traditional saw-tooth type radar detectors, as this method would increase the rate at which they cross each other.

The abundance of swept frequency plans and rates creates a problem. All of these radar receivers are emitting a first LO at a variety of frequencies, and a variety of sweep signatures. Other radar detectors can detect these signatures. This is commonly referred to in the industry as the detection of police radar detectors, "PRD falsing". In order to minimize this annoyance, radar detector manufacturers have adopted many different software techniques such as 2-sweep rule, 3-sweep rule and 4-sweep rule in order to assure the consumer of the presence of CW (continuous wave) police radar prior to alerting the consumer. Some have even resorted to designing the unit specifically to detect the presence of other radar detectors and ignore signals that reside on previous or future scans until the radar detector is no longer seen. All of these methods do a reasonable job in reducing the number of false occurrences when in the presence of other radar detectors but the time to respond to a valid police radar source can be from 300 ms to one second due to the time required to rule out offending police radar detectors.

For the average user, this time was not critical. If the radar detector took an additional 300 milliseconds to determine if it will alert the driver, the delay is not sufficient to place the driver in a position of being seen before he is notified of the radar event further down the road. However, with the recent introduction of the BEE III gun with POP™ (short burst) mode, radar can capture the speed of a vehicle in approximately 67 ms.

Therefore it would be desirable to have a method for defining the presence of police radar, while reducing false readings from other radar detectors in the vicinity, without the time delay of prior art methods.

SUMMARY OF THE INVENTION

The present invention provides a method for detecting radar. The invention begins by sweeping a first local oscillator (LO). Once a band has been identified as containing a radar signal or a potential radar signal, the detector interrupts its normal operation and immediately rechecks the frequency in question for confirmation of CW radar, rather than waiting for the initial sweep to finish.

If the information was from a CW source, one can be assured of seeing the information again when rechecking the same frequency immediately. By contrast, if the initial information were from a swept radar detector, the information will not be present when the suspect frequency is rechecked. In such a case, the offending swept radar detector will have moved to a different frequency during the intervening time and will not be seen again during the immediate recheck of the suspect frequency containing the initial information.

Upon receiving partial information from the initial sweep, the detector may repeat this sweep at a slower rate in order to improve sensitivity towards a conventional CW source.

BRIEF DESCRIPTION OF THE DRAWINGS

A more complete understanding of the method and apparatus of the present invention may be had by reference to the following detailed description when taken in conjunction with the accompanying drawings, wherein:

FIG. 2 is a diagram illustrating a "saw tooth" method for detecting police radar in accordance with the prior art;

FIG. 3 illustrates a method for detecting police radar, using a reverse pattern from that of the saw tooth method, in accordance with the prior art;

DETAILED DESCRIPTION OF THE INVENTION

Figure 1A:
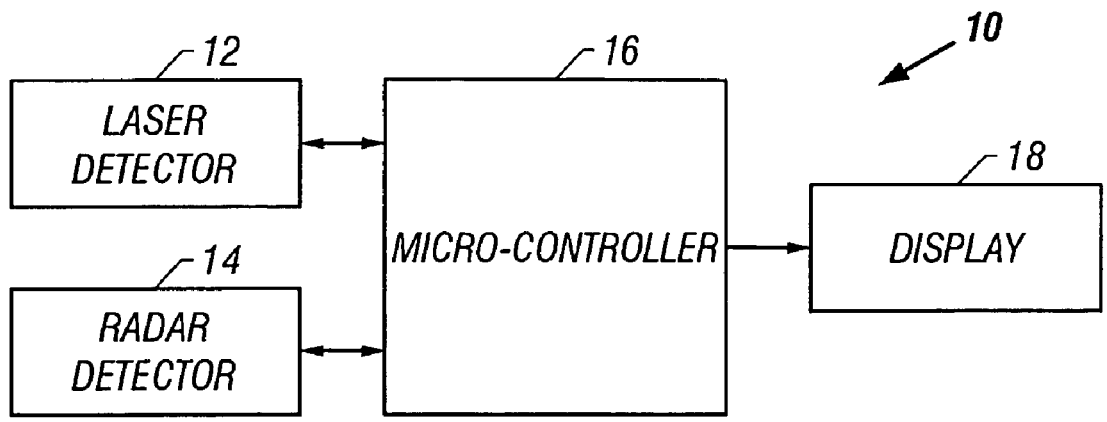
FIG. 1A is a block diagram illustrating a combination radar/laser detector device in which the present invention may be implemented.
Figure 1B:
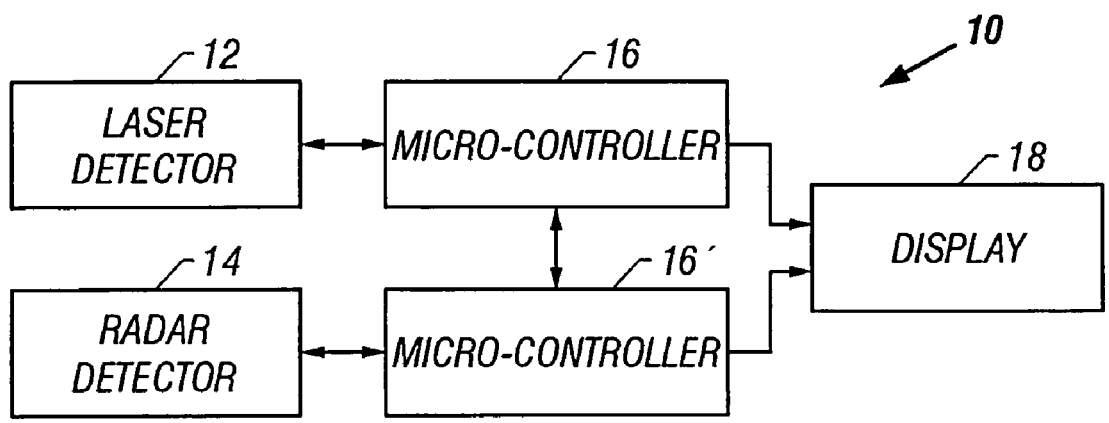
FIG. 1B is a block diagram illustrating a combination radar/laser detector device with a dual-microprocessor configuration in which the present invention may be implemented.

A block diagram of the electronic assembly of the preferred detector device is presented in FIGS. 1a and 1b. While there are many known electronic assemblies that would be adequate for this application, a device as described in U.S. Pat. No. 5,990,821, the disclosure of which is expressly incorporated herein by reference, will suffice. The detector device is a combination laser/radar detector 10 comprising a laser detector circuit 12 and a radar detector circuit 14. Laser detector circuit 12 and radar detector circuit 14 are each coupled to a microcontroller 16. Microcontroller 16 receives signals fed thereto from each of the laser and radar detector circuits 12, 14 and in response thereto microcontroller 16 provides control signals to the laser and radar detector circuits 12, 14 and to a display 18.

Displaying means may include, for example, a display screen comprised of light emitting diodes (LEDs). Alternatively or in addition thereto, displaying means may include a liquid crystal display (LCD) a vacuum fluorescent (VF) display or an LED segment display and the corresponding driver circuits. Those of ordinary skill in the art will recognize, of course, that other types of displays may also be used.

It should be noted that microcontroller 16 is here shown as a single microcontroller coupled to both the laser and radar detector circuits 12, 14. As shown in FIG. 1b, however, in an alternate embodiment of detector system 10, a pair of microcontrollers 16, 16' may be provided with a first one of the pair being coupled to a first one of the laser and radar detector circuits 12, 14 and a second one of the pair of microcontrollers being connected to a second one of the laser and radar detector circuits 12, 14. The choice between using a single microcontroller or a pair of microcontrollers may be made according to a variety of factors including but not limited to the cost of manufacturing the detector system 10 having one microcontroller compared with the cost of manufacturing the detector system 10 having a plurality of separate microcontrollers.

Referring now to FIG. 2, a diagram illustrating a "saw tooth" method for detecting police radar is depicted in accordance with the prior art. This method has been used on the majority of receivers for years and is very economical. Each "saw tooth" 210 and 220 represents a detector sweep over a particular range of radio frequencies. The paired information 201 and 202 on each sweep (210 and 220, respectively) is representative of alarm pulses necessary for band identification.

Upon detecting radar on a given sweep, manufacturers using this approach complete the sweep and then repeat the entire sweep a second, third, or fourth time to assure the presence of continuous wave (CW) radar versus information from an adjacent radar detector in a nearby car. This method does a reasonable job of filtering out false reports from other radar detectors of this type but requires significant time to repeat the sweep multiple times.

Using the example in FIG. 2, during the first sweep 210, the detector receives a paired alarm pulse 201, which might indicate the presence of CW (police) radar or another radar detector nearby. In order to confirm the likelihood of CW radar, the detector performs another sweep 220 and detects another paired pulse 202 at the same frequency (band). The detector may perform additional sweeps, but two is sufficient to illustrate the principle. Since a second paired pulse 202 is detected at the same band as the first pair pulse 201, it is unlikely that the signal is emitted by another detector, since a detector would continue sweeping and would not likely produce another alarm pulse at the same frequency. Therefore, if multiple alarms pulses are detected at the same band, it can be assumed with a high degree of confidence that the signal is coming from a police CW radar system.

However, there is a considerable time penalty in performing these multiple sweeps, which is a disadvantage when attempting to detect the fast POP police radars (explained in further detail below).

FIG. 3 illustrates a method for detecting police radar using a reverse pattern from that of the saw tooth method in accordance with the prior art. This reverse sweep pattern has been used by a few manufacturers to minimize false alarms caused by radar detectors using the saw tooth direction sweep illustrated in FIG. 2. The principle is similar to that illustrated in FIG. 2. A first sweep 310 is performed, and if a paired an alarm pulse 301 is detected, a second sweep 320 is performed. The presence of a paired alarm pulse 302 on the second sweep 320 indicates the presence of CW radar.

Because the crossing rates of the FIG. 3 sweep pattern opposes the pattern in FIG. 2, sensitivity toward detectors using the FIG. 2 saw tooth pattern is dramatically reduced. The sweep pattern illustrated in FIG. 3 does not offer a time or performance advantage over that of FIG. 2 with regard to police radar. Its primary benefit is a reduction of false alarms caused by more conventional saw tooth detectors. The manufacturer may or may not require additional sweeps to confirm CW versus other radar detectors, depending on the frequency plan and sensitivity to other detector models available on the market.

Figures 4, 5:
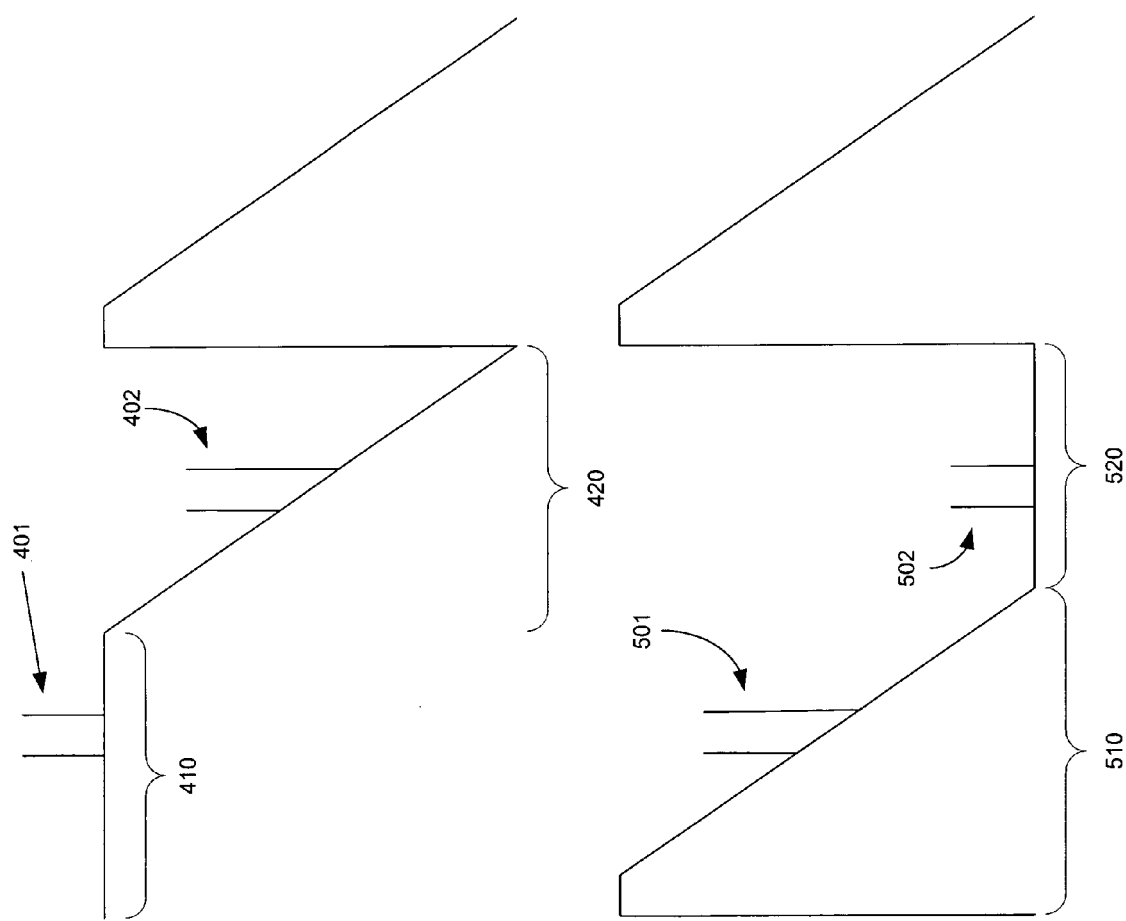
FIG. 4 illustrates a radar detection method using both continuous wave and swept approaches in accordance with the prior art.
FIG. 5 illustrates an alternate radar detection method comprising both continuous wave and swept approaches, using a reverse pattern to that in FIG. 4, in accordance with the prior art.

FIG. 4 illustrates a radar detection method using both CW and swept approaches in accordance with the prior art. The method depicted in FIG. 4 begins in the CW mode 410, in which it is looking for sweeping emissions from other detectors. If sweeping radar is detected (indicated by alarm pair 401) during the CW operation, the detector may choose to ignore alarm pair signals 402 subsequently detected during its own sweep operation 420, in order to reduce false positives from other detectors. However, if no radar information is present during the CW operation 410, the detector may respond to radar alarm pair signals 402 subsequently detected during the sweep operation 420 due to the higher confidence that it came from police radar and not another detector.

An alternate method depicted in FIG. 5 follows the same general principle as that of FIG. 4. In this alternate method, the detector begins with a swept operation 510, and if a radar alarm pair signal 501 is detected, the detector switches to a CW operation 520 to determine if the signal is from another sweeping detector. If an alarm pair signal 502 is detected during the CW mode 520, the detector may ignore it on subsequent sweeps.

The major disadvantage of the mixed methods depicted in FIGS. 4 and 5 is extra time spent searching for other radar detectors rather than police radar.

With the introduction of POP (short burst) mode, some police radar units only transmit for 67 milliseconds. POP was introduced on handheld radars in 1999 and has also been incorporated into the newest dash mounted radars. POP technology is aimed at defeating radar detectors. Ordinary police radar tries to circumvent detectors with a Standby or Hold switch. However, by the time the radar has been on long enough to process a vehicle's speed, the transmitter has already set off every radar detector within two miles of the operator. POP technology makes the police radar able to measure vehicle speeds without setting off many radar detectors. This technology is made possible by microwave sources that can turn on and stabilize quickly and by digital signal processing (DSP) techniques.

The POP radar can obtain a reasonably accurate speed reading in 67 ms, which is far faster than an operator can operate a switch. When the police radar is placed into POP mode, the radar emits a short burst of energy when an antenna button is pressed and quickly measures a vehicle's speed. The radar then goes immediately into standby and displays the target's speed for a couple of seconds. The entire measurement happens so quickly that traditional radar detectors cannot see it. If the vehicle's speed is of interest, the operator can place the radar into normal mode, allowing the officer to track and lock the vehicle's speed.

Today's super-wideband radar detectors need to scan a wide diversity of radar frequencies: X band from 10.500–10.550 GHz, K band from 24.050–24.250 GHz, and Ka band from 33.400–36.000 GHz. In order to accomplish this, the radar detector must scan between a start frequency and stop frequency, combining with other local oscillators (LO's) in order to give complete coverage. Scanning requires time, which becomes critical when trying to detect POP radar systems.

The rate at which different frequencies are scanned is expressed in MHz/ms. Maintaining sensitivity requires a slow MHz/ms scan rate. Increasing this scan rate subjects the receiver to lower performance. Most manufacturers use a scan rate of 2–4 MHz/ms. However, responding to a 67 ms pulse at any given time requires a much faster scan rate if one wants to cover all the traditional police X, K, and Ka bands. Detecting a 67 ms pulse may require a scan rate of 7–10 MHz/ms or more in order to respond a high percentage of the time. Such an increase in scan rate will dramatically reduce sensitivity, not only to the POP type radar, but to other police radar systems as well.

Figure 6:
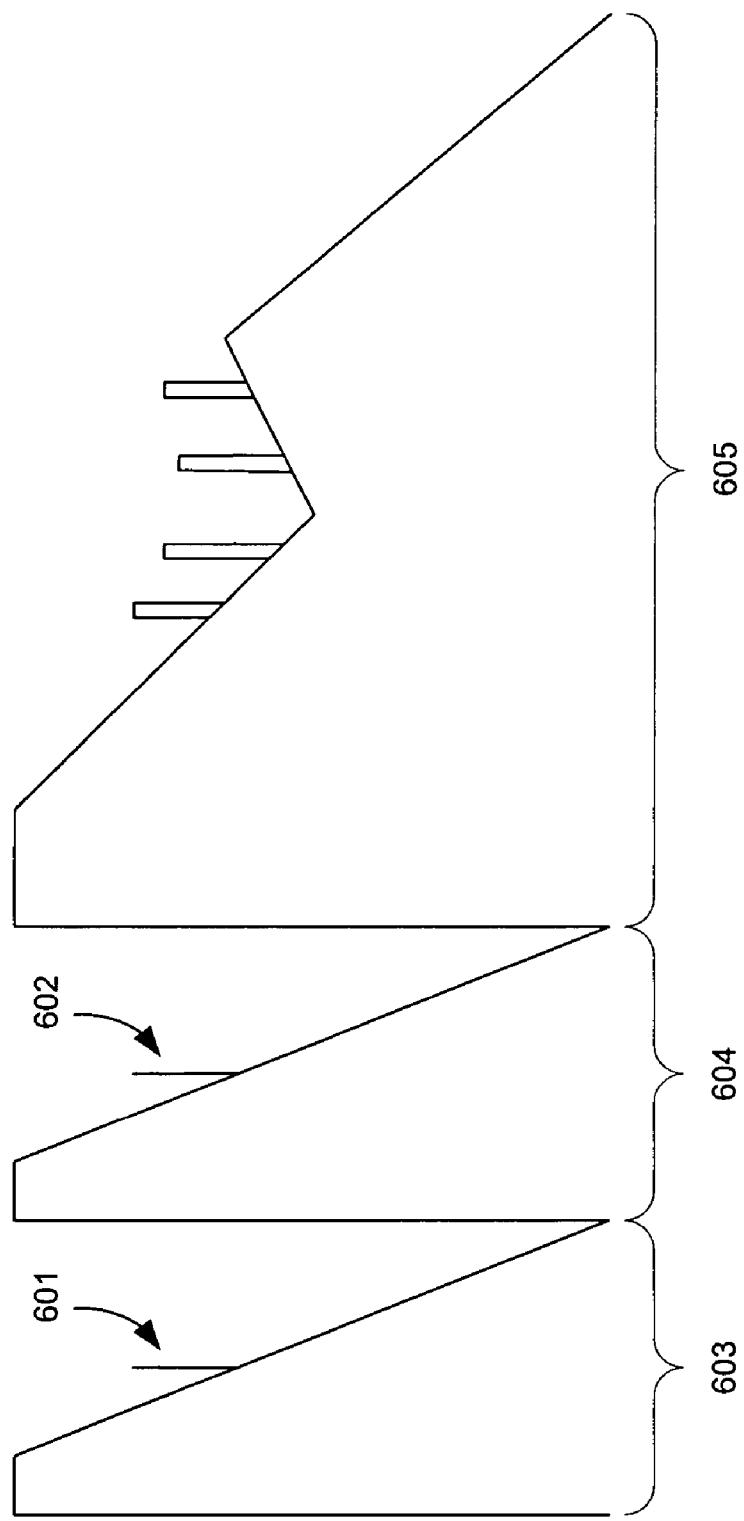
FIG. 6 illustrates a radar detection method using an interrupted sweep pattern with variable scan rates in response to a single alarm pulse, in accordance with the present invention.

Referring now to FIGS. 6 and 7, diagrams illustrating an interrupted sweep pattern with variable scan rate are depicted in accordance with the present invention. As explained above, the radar detector may need to sweep at a very fast scan rate in order to ensure a near 100% success rate of POP mode response and still scan for all the FCC approved police frequencies. This very fast scan rate can reduce performance greatly for some police radar bands.

The present invention overcomes the problems of the prior art methods by immediately confirming the presence of CW radar after first defining Band Identification. The present invention begins by sweeping a first local oscillator (LO). Once a band has been identified as containing a radar signal, the detector interrupts its normal operation and rechecks the frequency in question for confirmation of CW radar, rather than waiting for the initial sweep to finish. If the information was from a CW source one can be assured to see the information again when rechecking the same frequency. By contrast, if the initial information were from a swept radar detector, the information will not be present when the same frequency is immediately rechecked, since a swept radar detector would have moved to a different frequency. This approach allows for high-percentage validation of likely CW radar sources, while avoiding the time penalty of prior art methods that perform multiple sweeps.

The present invention captures lost sensitivity towards conventional police radar, while maintaining a high percentage response to POP type radar. Normal operation scans in a fast mode, wherein sensitivity toward complete information necessary for band identification is compromised. However, it is possible in this fast mode to get partial information with minimal sensitivity loss. Upon receiving partial information from the initial fast scan, the detector may repeat this scan at a slower rate in order to improve sensitivity towards a conventional CW source. This is a low cost approach that comprises switching in a second capacitor and adjusting the scan time accordingly to maintain the same start and stop frequencies, without the need for a costly digital to analog converter.

Referring to the example in FIG. 6, if only one alarm pulse 601 is seen on the first fast scan 603, the unit will do a repeat fast scan 604. If the information 602 obtained on the second fast scan 604 is similar to that of the first, the unit will go to a slow scan mode 605 to improve performance. Alternatively, the unit may switch to the slow scan mode 605 after the first alarm pulse 601 is detected, according to desired response time and sensitivity. The unit will remain in the slow scan mode for further processing until the radar signal is no longer detected. The two-scan rule on a single alarm pulse may be necessary to minimize how often the detector will go into slow scan mode due to a single alarm pulse cause by an emission from another radar detector.

Figure 7A:
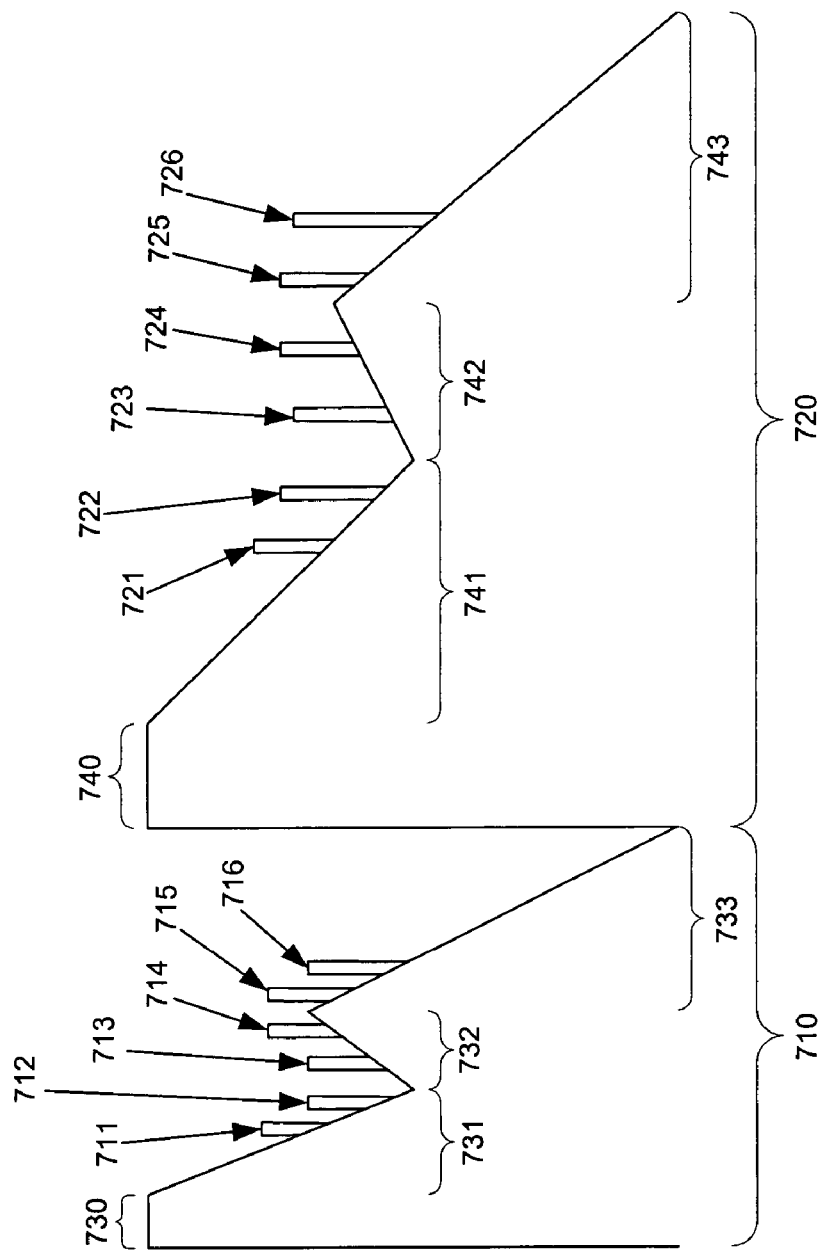
FIG. 7A illustrates a radar detection method using an interrupted sweep pattern with dual scan rates in response to an alarm pulse valid pair, in accordance with the present invention.

FIG. 7A illustrates a radar detection method using an interrupted sweep pattern with dual scan rates in response to an alarm pulse valid pair, in accordance with the present invention. If the initial radar signal is a valid pair 711, 712, the detector will interrupt its normal operation and rescan the area in question for verification of CW radar. If a confirmation pair exists as 713, 714 or 715, 716, the unit may respond at the end of the fast scan 710 and then go to a slow scan 720 and remain at the slower rate for further processing until the radar signal goes away. Once the radar signal goes away, the unit will resume the fast scan mode.

A fast scan 710 consists of a start frequency 730, followed by a change in frequency 731 to an end frequency, with a scan rate of 7 Mhz/ms or more. When valid paired alarm pulses 711, 712 are detected, they are treated with an "on-the-fly" verification re-scan 732 to confirm the presence of CW radar. This allows for a radar signal pair validation on scan 731 to re-scan after the second alarm pulse 712.

If confirmation pair information 713, 714 is available, the detector will perform another rescan 733 after the second confirmation alarm pulse 714. If confirmation pair information 713, 714 is not available, the detector will "time out" and perform another rescan 733. Another confirmation pair 715, 716 may be seen on this second rescan 733. Any combination of valid information on scan 731 and re-scans 732 or 733 will result in a validation of CW radar.

Slow scan 720 consists of a start frequency 740 followed by change in frequency 741 to an end frequency, with a scan rate slower than the fast scan 710 (e.g., 3.5 Mhz/ms). Again, when valid paired alarm pulses 721, 722 are detected, they are treated with an on-the-fly verification re-scan 742 to confirm the presence of CW radar. This allows for a radar signal pair validation on scan 741 to re-scan after the second alarm pulse 722. If confirmation pair information 723 and 724 is available, the detector will perform another re-scan 743 after the second confirmation alarm pulse 724. If confirmation pair information 723, 724 is not available, the detector will "time out" and still perform another rescan 743. Another confirmation pair 725, 726 may be seen on the second re-scan 743. Any combination of valid information on scan 741 and re-scans 742 or 743 will result in a validation of CW radar.

The slow sweep process described above in relation to FIG. 7A also applies to the slow sweep 605 in FIG. 6.

Figure 7B:
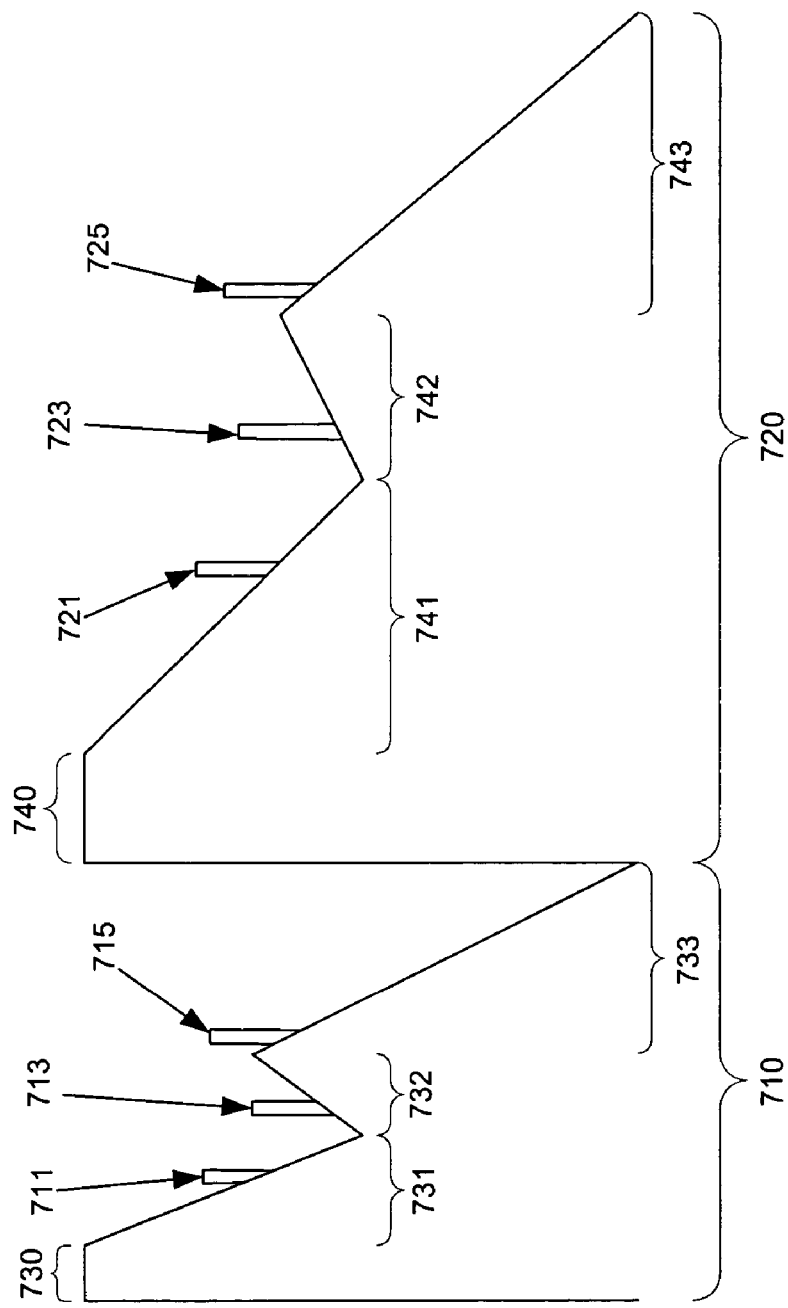
FIG. 7B illustrates a radar detection method using an interrupted sweep pattern with dual scan rates in response to a single alarm pulse, in accordance with the present invention.

FIG. 7B illustrates an alternate embodiment of the interrupted sweep pattern in accordance with the present invention. This alternate embodiment follows the same general pattern as described above in relation to FIG. 7A but relies on single pulses instead of valid pairs. Similarly, one can go in the opposite direction and implement the method of the present invention using pulse triplets or greater. The number of pulses used to confirm a signal does not change the underlying method of interrupting the fast scan in response to detecting a radar signal and then switching to a slower scan if the signal is detected again on the rescan.

Figure 8A:
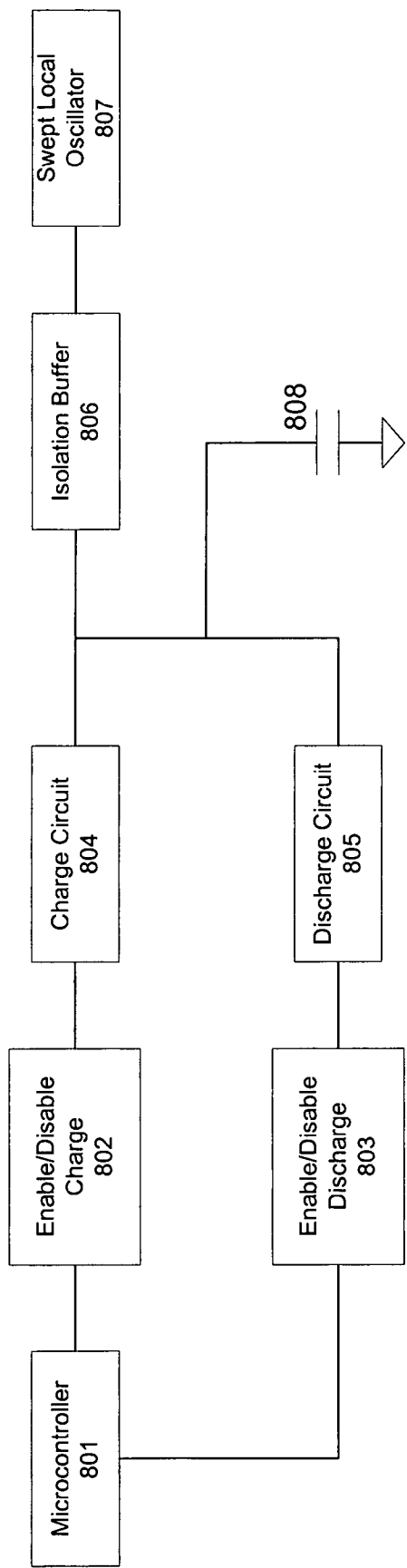
FIG. 8A illustrates a sweep generating and control system in accordance with the prior art.

FIG. 8A illustrates a sweep generating and control system in accordance with the prior art. A microcontroller 801 controls the enabling and disabling charge 802 and discharge 803 elements of the sweep charge 804 and discharge 805 circuits, thereby generating the typical sawtooth and CW mode patterns of FIG. 2 through FIG. 5. The sweep capacitor 808 voltage waveform drives the voltage controlled local oscillator 807 to provide the first scan rate necessary for the desired police band coverage.

Using this prior art method, in order to provide a second scan rate, a second charge and discharge circuit could be utilized, which would generate the necessary timing elements and sweep function to scan the same desired frequency in a different timeframe to produce the desired second scan rate. However, the duplication of circuitry would come at a considerable cost penalty.

Figure 8B:
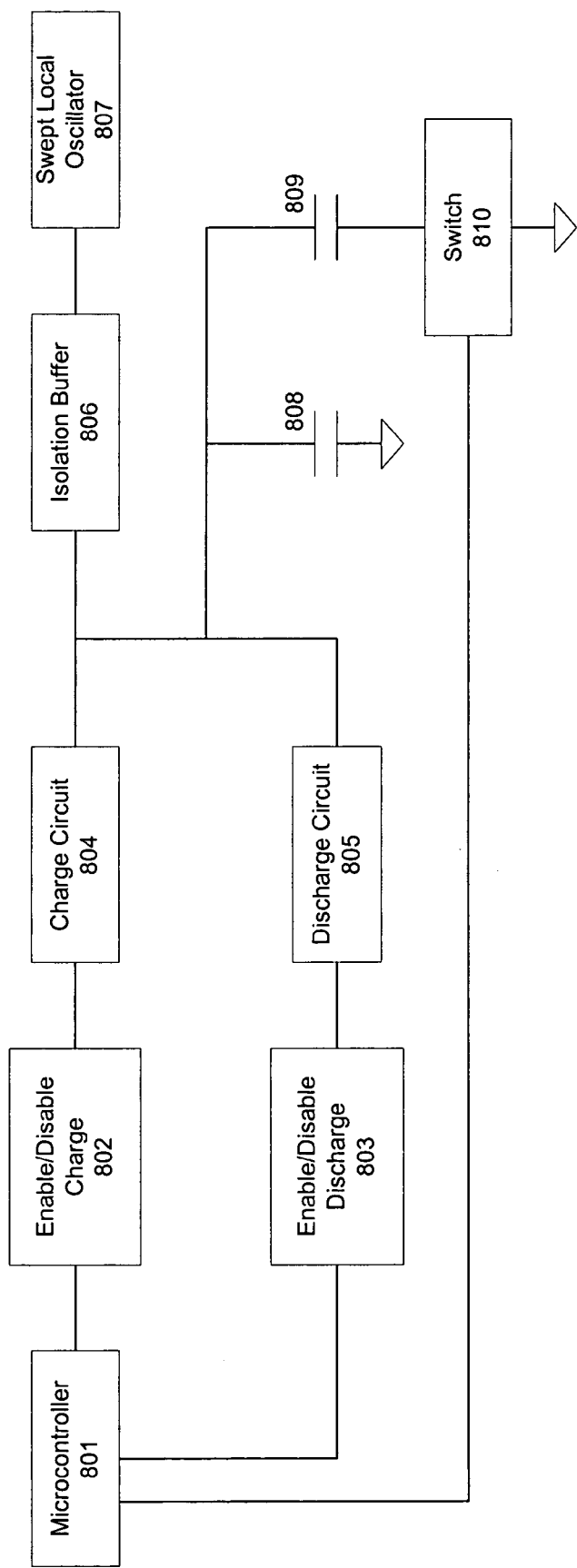
FIG. 8B illustrates a low cost generating control mechanism in accordance with the present invention.

FIG. 8B illustrates a low cost generating control mechanism in accordance with the present invention. Instead of adding a second discharge circuit, the present invention utilizes a switch 810 to switch in an additional capacitor 809 controlled by the microcontroller 801. This second capacitor 809 causes the scan rate to change by providing an altered capacitance value.

Figure 8C:
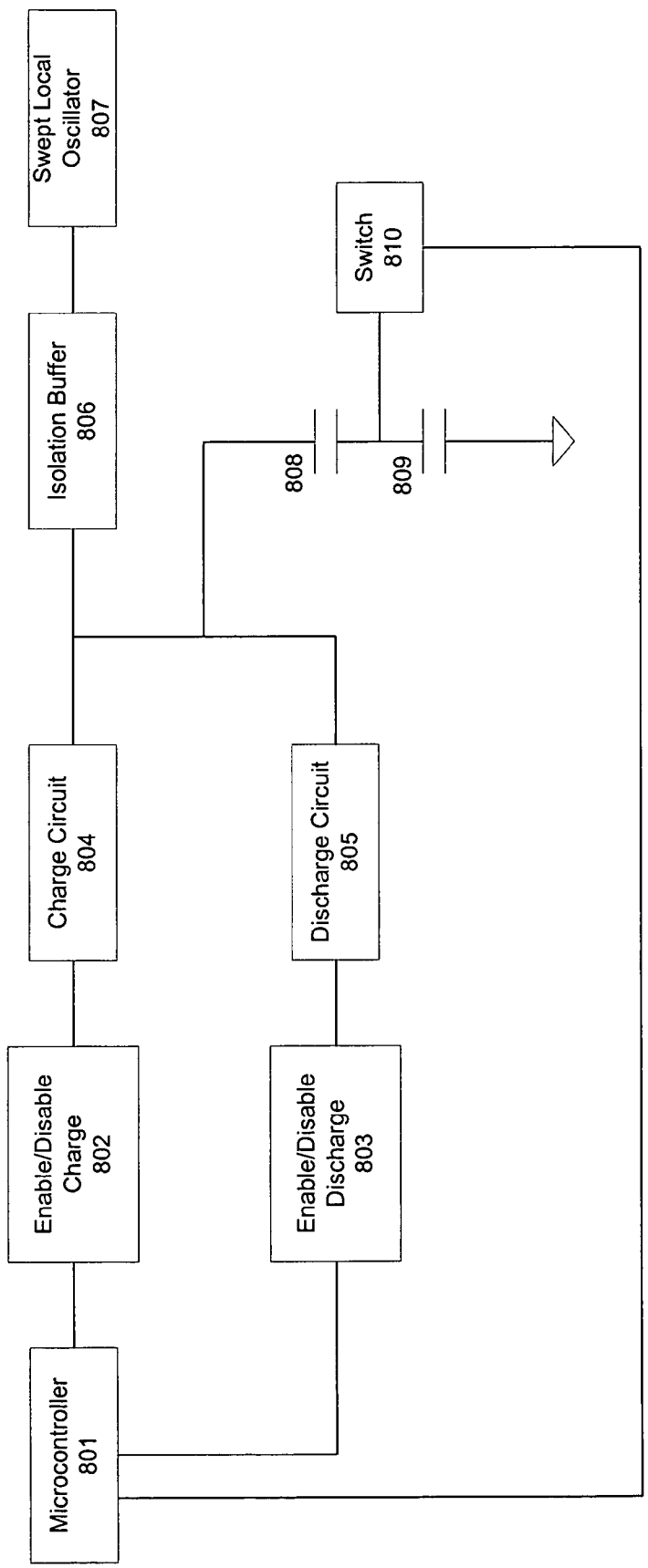
FIG. 8C illustrates an alternate mechanism for changing capacitance values in accordance with the present invention.

FIG. 8C illustrates an alternate mechanism for changing capacitance values in accordance with the present invention. This alternate embodiment places the two capacitors 808, 809 in series. When the fast scan is requested, the two capacitors 808, 809 in series combine to a value less than the lowest capacitor in the circuit. When the slow scan is requested by the microcontroller 801, a switch 810 in engaged and the capacitance value increases. This alternate embodiment utilizes two capacitors in series but could consist of several capacitors in a series/parallel combination to obtain the desired value. Subsequently, the switch 810 could be configured to select the desired alternate capacitance value. Whereas in FIG. 8B the capacitance value is increased by switching in the second capacitor 809, in FIG. 8C, the capacitance value is increased by switching out the second capacitor 809.

Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A method for detecting Continuous Wave (CW) police radar, wherein sensitivity toward conventional CW police radar is maintained while decreasing time to respond to short burst CW police radar, the method comprising the steps of:
scanning a frequency band between a first frequency and a second frequency at a first scan rate; and
if a radar signal is detected at the first scan rate, re-scanning said frequency band at a second scan rate;

wherein the second scan rate is generated by altering capacitance values.

2. The method according to claim 1, wherein the first scan rate is faster than the second scan rate.

3. The method according to claim 2, wherein the first scan rate is 7 MHz/ms and the second scan rate is 3.5 MHz/ms.

4. The method according to claim 1, wherein the second scan rate provides improved detection sensitivity to the first scan rate.

5. A method for detecting Continuous Wave (CW) police radar while rejecting interfering signals from swept radar sources, the method comprising the steps of:
   performing a first scan of a frequency band between a first frequency and a second frequency at a first scan rate;
   if a first identified radar signal is detected during said first scan, interrupting the first scan before completion and rescanning the specific frequency at which said first identified radar signal was detected, wherein if a second identified radar signal is detected during the rescan within a specified time period, the second identified radar signal indicates the presence of CW police radar; and
   resuming the interrupted first scan after said specified time period.

6. The method according to claim 5, wherein the first identified radar signal comprises a two-pulse signature.

7. The method according to claim 5, wherein the first identified radar signal comprises a single-pulse signature.

8. The method according to claim 5, wherein the second identified radar signal comprises a two-pulse signature.

9. The method according to claim 5, wherein the second identified radar signal comprises a single-pulse signature.

10. A radar detector that minimizes response time in detecting short burst continuous wave (CW) police radar while maintaining detection sensitivity to conventional CW police radar, the detector comprising:
    a local oscillator that scans a frequency band between a first frequency and a second frequency;
    means for generating a first capacitance value that allows the local oscillator to scan said frequency band at a first scan rate; a
    means for generating a second capacitance value that allows the local oscillator to scan said frequency band at a second scan rate; and
    a microcontroller that switches the radar detector from the first capacitance value to the second capacitance value in response to detection of a radar signal at the first scan rate.

11. The radar detector according to claim 10, wherein the first scan rate is faster than the second scan rate.

12. The radar detector according to claim 11, wherein the first scan rate is 7 MHz/ms and the second scan rate is 3.5 MHz/ms.

13. The radar detector according to claim 10, wherein the second scan rate provides improved detection sensitivity to the first scan rate.

14. A radar detector that detects Continuous Wave (CW) police radar while rejecting interfering signals from swept radar sources, the detector comprising:
    a local oscillator that scans a frequency band between a first frequency and a second frequency;
    means for generating a first capacitance value that allows the local oscillator to scan said frequency band at a first scan rate; and
    a microcontroller that interrupts the local oscillator if a first identified radar signal is detected while scanning said frequency band and instructs the local oscillator to re-scan the specific frequency at which said first identified radar signal was detected, wherein if a second identified radar signal is detected during the rescan within a specified time period, the second identified radar signal indicates the presence of CW police radar.

15. The radar detector according to claim 14, wherein the first identified radar signal comprises a two-pulse signature.

16. The radar detector according to claim 14, wherein the first identified radar signal comprises a single-pulse signature.

17. The radar detector according to claim 14, wherein the second identified radar signal comprises a two-pulse signature.

18. The radar detector according to claim 14, wherein the second identified radar signal comprises a single-pulse signature.

* * * * *